(12) United States Patent
Kaneko

(10) Patent No.: US 9,172,617 B2
(45) Date of Patent: Oct. 27, 2015

(54) MANAGEMENT APPARATUS, MANAGEMENT SYSTEM, CONTROL METHOD, AND STORAGE MEDIUM

(71) Applicant: CANON KABUSHIKI KAISHA, Tokyo (JP)

(72) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/990,293

(22) PCT Filed: Apr. 3, 2013

(86) PCT No.: PCT/JP2013/002328
§ 371 (c)(1),
(2) Date: May 29, 2013

(87) PCT Pub. No.: WO2013/150796
PCT Pub. Date: Oct. 10, 2013

(65) Prior Publication Data
US 2014/0082173 A1    Mar. 20, 2014

(30) Foreign Application Priority Data

Apr. 6, 2012  (JP) .................................. 2012-087071

(51) Int. Cl.
*G06F 15/173* (2006.01)
*H04L 12/24* (2006.01)
*H04N 1/00* (2006.01)

(52) U.S. Cl.
CPC ............ *H04L 41/24* (2013.01); *H04N 1/00344* (2013.01); *H04N 2201/0081* (2013.01); *H04N 2201/0082* (2013.01); *H04N 2201/0091* (2013.01); *H04N 2201/0093* (2013.01)

(58) Field of Classification Search
CPC ............................ H04N 1/00344; H04L 41/24
USPC ........................................................ 709/223
See application file for complete search history.

(56) References Cited

U.S. PATENT DOCUMENTS

2002/0052938 A1* 5/2002 Kanemitsu .................... 709/220
2002/0156937 A1  10/2002 Wong et al. .................... 709/328
(Continued)

FOREIGN PATENT DOCUMENTS

JP      2007-334612 A    12/2007
JP      2012-037944 A     2/2012

OTHER PUBLICATIONS iPhone Users Guide IOS 3.1 (Apple, Sep. 9, 2009).*
(Continued)

*Primary Examiner* — Michael Y Won
*Assistant Examiner* — Nicholas Celani
(74) *Attorney, Agent, or Firm* — Fitzpatrick, Cella, Harper & Scinto

(57) ABSTRACT

A management server receives a server instruction inquiry from an image forming apparatus, and transmits a communication switching instruction to the image forming apparatus as a response to the server instruction inquiry, such that the communication switching instruction switches the communication system for communicating with the image forming apparatus to push communication. After push communication has been established by conducting an initial communication with the image forming apparatus according to the communication switching instruction, the management server issues server instructions to the image forming apparatus by push communication.

14 Claims, 12 Drawing Sheets

(56) References Cited

U.S. PATENT DOCUMENTS

| | | | |
|---|---|---|---|
| 2004/0017312 A1* | 1/2004 | Anderson et al. | 342/457 |
| 2004/0254993 A1* | 12/2004 | Mamas | 709/206 |
| 2005/0132030 A1* | 6/2005 | Hopen et al. | 709/223 |
| 2005/0193140 A1* | 9/2005 | Tiedemann et al. | 709/232 |
| 2007/0106804 A1* | 5/2007 | Bosschaert et al. | 709/229 |
| 2007/0156877 A1* | 7/2007 | Krishnan et al. | 709/223 |
| 2007/0294228 A1* | 12/2007 | Kawana | 707/3 |
| 2009/0024872 A1* | 1/2009 | Beverly | 714/25 |
| 2009/0204571 A1* | 8/2009 | Shizuno | 707/2 |
| 2010/0281107 A1* | 11/2010 | Fallows et al. | 709/203 |
| 2011/0125856 A1* | 5/2011 | Chu et al. | 709/206 |
| 2012/0036570 A1 | 2/2012 | Wada | 726/11 |

OTHER PUBLICATIONS

Osamu Takahashi, "Push Type Information Delivery Service and Its Protocols," Information Processing, IPSJ Magazine, Nov. 16, 1998, No. 39, vol. 11, pp. 1124-1131.

* cited by examiner

| SEQUENCE | SERVER INSTRUCTION CONTENT |
|---|---|
| 1 | SCHEDULE MODIFICATION REQUEST |
| 2 | REBOOT REQUEST |
| 3 | SETTING INFORMATION TRANSMISSION REQUEST |
| 4 | MONITORING SUBJECT ADDITION REQUEST |
| 5 | FIRMWARE UPDATING REQUEST |

| MALFUNCTION CODE | SERVICEMAN DISPATCH NECESSARY/UNNECESSARY |
|---|---|
| E7xx | UNNECESSARY |
| E2xx | UNNECESSARY |
| ⋮ | ⋮ |

Fig. 16

| Customer information | Maintenance information | System management | Master management |

Sales organization name: L4:ADM07 RIAdev_JP ▼
Search conditions: Search with customer ID (complete match) ▼ kosugi0001

[Search] [Reset]

ADM07 RIAdev_JP > Company A: Kosugi Enterprises

> Device information
  > Malfunction/communication test information
  > Confirmation of consumables status
  > Service mode information
  > Firmware information
  > Confirmation of number of malfunction occurrences
  > Setting of log transmission
> Consumables management information
  > Toner/Ink inventory adjustment
  > Parts inventory adjustment
  > Setting of consumable life
> Communication information
  > Communication status confirmation
  > RDS debug log
> Counter information
  > Charge counter
  > Form size counter
  > Toner bottle counter
  > Department counter
> Connection device information
  > Confirmation of number of connection units

[Search options]

Company A: Kosugi Enterprises (kosugi0001)

Display switching: Device list ▼          There is a device for which Web Socket communication is underway — 1601

Display of 1-13 cases out of 13 cases        Number of displayed cases: 100

| Device ID △ | Product name ◇ | Customer name ◇ | RDS ID ◇ | RDS version ◇ | Service category ◇ | |
|---|---|---|---|---|---|---|
| CCCCCCCCCCCC | aaa | Company A: Kosugi Enterprises | CCCCCCCCCCCC | Embedded RDS V1.0 | Basic | Select |
| IJP0000022 | bbb | Company A: Kosugi Enterprises | CAPT00000000 | RDS Agent V3.2 | Advanced | Select |
| KEKEKEKEKEKE | ccc1 | Company A: Kosugi Enterprises | KEKEKEKEKEKE | Embedded RDS V1.0 | Advanced | Select |
| KOSUGI000001 | ccc1 | Company A: Kosugi Enterprises | CAPT00000000 | RDS Agent V3.2 | Advanced | Select |
| KOSUGI000002 | ddd | Company A: Kosugi Enterprises | CAPT00000000 | RDS Agent V3.2 | Advanced | Select |
| KOSUGI000004 | eee1 | Company A: Kosugi Enterprises | CAPT00000000 | RDS Agent V3.2 | Advanced | Select |
| KOSUGI000006 | eee2 | Company A: Kosugi Enterprises | CAPT00000000 | RDS Agent V3.2 | Advanced | Select |
| KOSUGI000007 | ccc2 | Company A: Kosugi Enterprises | CAPT00000000 | RDS Agent V3.2 | Advanced | Select |
| KOSUGI000008 | ccc3 | Company A: Kosugi Enterprises | CAPT00000000 | RDS Agent V3.2 | Advanced | Select |
| KOSUGI000009 | eee3 | Company A: Kosugi Enterprises | CAPT00000000 | RDS Agent V3.2 | Advanced | Select |
| KOSUGI000010 | ccc1 | Company A: Kosugi Enterprises | CAPT00000000 | RDS Agent V3.2 | Advanced | Select |
| KOSUGI000011 | ccc2 | Company A: Kosugi Enterprises | CAPT00000000 | RDS Agent V3.2 | Advanced | Select |
| KOSUGI000012 | ccc3 | Company A: Kosugi Enterprises | CAPT00000000 | RDS Agent V3.2 | Advanced | Select |

[Previous] [Next]

1602

MANAGEMENT APPARATUS, MANAGEMENT SYSTEM, CONTROL METHOD, AND STORAGE MEDIUM

TECHNICAL FIELD

The present invention relates to technology for managing network devices such as image forming apparatuses.

BACKGROUND ART

A management system is proposed which is provided with a management server that communicates with image forming apparatuses via a network such as an Internet. Here, in a network environment where a firewall is provided in a local network in which image forming apparatuses are deployed, it is impossible to directly issue a setting modification instruction, a reboot instruction or the like to an image forming apparatus from the management server. Therefore, in this type of network environment, the image forming apparatus polls the management server to inquire about the existence of instructions.

Patent Document 1 discloses a device management system in which, if an inquiry about the existence of instructions is received in passing from a management target device, and if an instruction exists, the management server returns the instruction in the operative session upon receipt of the inquiry.

CITATION LIST

Patent Literature

Patent Document 1: Japanese Patent Application Laid-Open No. 2007-334612

There are cases where it is desirable to have a management server issue instructions to an image forming apparatus in real time. Examples of instructions carried out in real time by a management server are reboot instructions, firmware updating instructions and the like for recovery from malfunctions that occur in an image forming apparatus.

However, in conventional systems where an image forming apparatus polls a management server to inquire about the existence of instructions, polling intervals are set long to take account of the load on the management server. Therefore, with conventional systems, the management server cannot issue instructions to an image forming apparatus in real time.

In order to enable instructions to an image forming apparatus to be issued in real time by a management server, it would be conceivable to switch the communication method between the management server and the image forming apparatus from polling communication to push communication. Push communication refers an Internet-based communication method, and communication requests are initiated by a server. As examples of push communication, one may cite WebSocket and the like. WebSocket has been published as RFC 6455 enacted by the IETF (Internet Engineering Task Force).

In the case where a management server manages network devices such as image forming apparatuses via a firewall, an exchange of information is conducted according to the polling format as described above. Consequently, if that communication format is switched to push communication such as WebSocket, and if communication paths are established, it is necessary to study what type of sequence is required.

With push communication, in contrast to the polling format, an exchange of data is conducted only when necessary. Consequently, although the volume of communication decreases, a load is imposed on the management apparatus (management server) in order to maintain the session. Therefore, when communication with all image forming apparatuses that are management targets is push communication, the resource load of the management apparatus increases in order to maintain the session. For this reason, it is necessary to suppress increases in the load of the management apparatus by using push communication for communication between the management apparatus and the image forming apparatus only in prescribed cases.

SUMMARY OF INVENTION

The present invention provides management apparatus functions which serve to appropriately switch a communication system for communication with network devices such as image forming apparatuses to a communication system that enables instructions to be issued to the pertinent devices without requests from the pertinent devices. In addition, with respect to switching of the communication system for communication with the network devices, the present invention provides a mechanism which enables switching of the communication system that takes account of prescribed conditions.

An Internet-based management apparatus that manages image forming apparatuses of the present invention includes: a receiving means for receiving inquiries from the image forming apparatuses; a transmission means for transmitting a switching instruction to the image forming apparatus in response to the received inquiry, such that the switching instruction switches a communication system for communication between the image forming apparatus and the management apparatus to a prescribed communication system that enables instructions to be issued from the management apparatus without a request from the image forming apparatus; an instructional means for issuing instructions to the image forming apparatus according to the prescribed communication system that has been established, after the prescribed communication system has been established by an initial communication with the image forming apparatus in response to the switching instruction; and a disconnect means for cutting off communication by the prescribed communication system under prescribed conditions.

Effects of the Invention

According to the present invention, it is possible to appropriately switch a communication system for communication between a management apparatus and a network device to a communication system that enables instructions to be issued to the pertinent device without a request from the pertinent device. It is also possible to achieve efficient two-way communication while suppressing load on the management apparatus side by taking prescribed conditions into account when conducting such switching.

Further features of the present invention will become apparent from the following description of exemplary embodiments with reference to the attached drawings.

BRIEF DESCRIPTION OF DRAWINGS

FIG. 16 is an example of a screen that is displayed by a management server.

DESCRIPTION OF EMBODIMENTS

Figure 1:
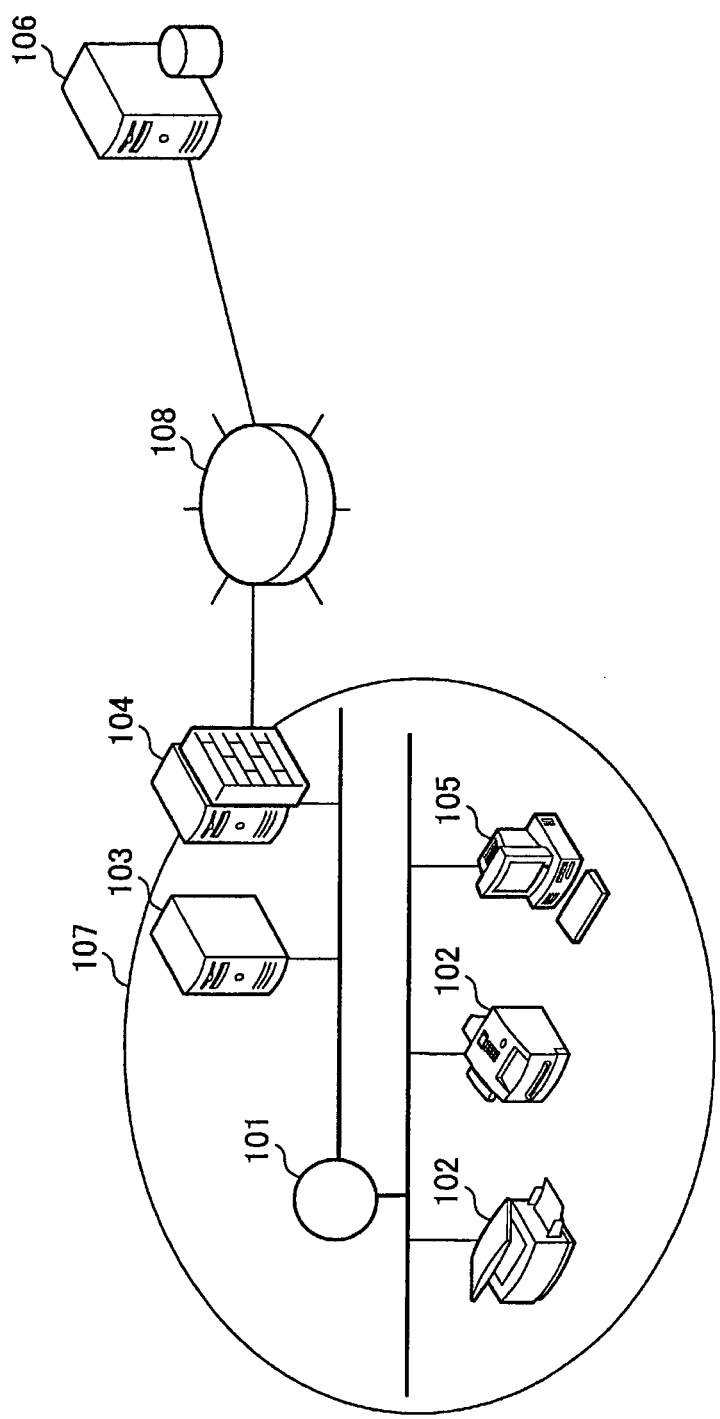
FIG. 1 illustrates an exemplary system configuration of the present embodiment.

FIG. 1 is a drawing which illustrates a system configuration example of the present embodiment. A management system of the present embodiment is provided with image forming apparatuses 102, and a management server 106 which is an Internet-based management apparatus that manages the image forming apparatuses 102. The management server 106 communicates with the image forming apparatuses 102 via an Internet 108 which is one type of network.

Reference number 101 indicates a LAN (Local Area Network). Reference number 103 indicates a proxy server. Reference number 104 indicates a firewall which is installed to enhance the security of an intranet 107. Reference number 105 indicates a personal computer (PC) which is used by an ordinary user for business and the like. The image forming apparatuses 102 which are the network devices and the PC 105 are interconnected via the LAN 101. The intranet 107 is a local network in which the image forming apparatuses 102, proxy server 103, and firewall 104 are interconnected via the LAN 101. There is one intranet 107 in the example shown in FIG. 1, but in practice, the management server 106 and multiple intranets 107 are interconnected via the Internet 108.

Network devices include network-connectable equipment such as image forming apparatuses and mobile information terminals, and can be managed by remote servers that are set up on an Internet or the like. The image forming apparatus 102 is, for example, a digital copier, facsimile machine, laser printer, inkjet printer, scanner, or the like. The image forming apparatus 102 conducts communication via the LAN 101 according to a communication schedule, and the information of the image forming apparatus 102 (hereinafter 'device information') is transmitted to the management server 106 via the Internet 108. Device information consists of, for example, counter values, operational status logs, and malfunction information. Counter values indicate the total number of printed print-outs.

The management server 106 receives and stores device information from the image forming apparatuses 102. By this means, the management server 106 conducts integrated management of the operational statuses of the image forming apparatuses 102. Acquisition of device information from the image forming apparatuses 102 by the management server 106 is accomplished by MIB exchange via SNMP. SNMP is an abbreviation for Simple Network Management Protocol. MIB is an abbreviation for Management Information Base. In this example, the image forming apparatuses 102 transmit device information to the management server 106 using HTTPS, but there are no particular limitations on the communication protocol, and HTTP may also be used.

Figure 2:
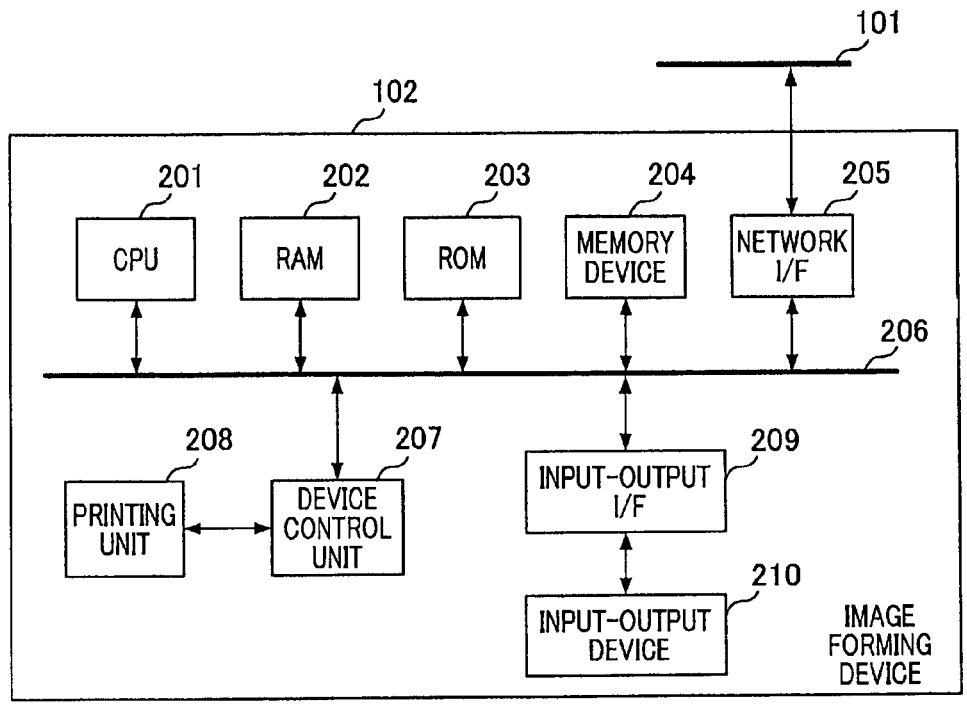
FIG. 2 illustrates an exemplary hardware configuration of an image forming apparatus.

FIG. 2 illustrates an exemplary hardware configuration of an image forming apparatus. The image forming apparatus 102 is provided with a CPU 201, a RAM 202, a ROM 203, a memory (HDD) 204, a network I/F (interface) 205, an internal bus 206, a device control unit 207, a printing unit 208, an input-output I/F 209, and an input-output device 210. CPU is an abbreviation for Central Processing Unit. RAM is an abbreviation for Random Access Memory. ROM is an abbreviation for Read Only Memory. HDD is an abbreviation for Hard Disk Drive.

The CPU 201 controls the entirety of the image forming apparatus. The CPU 201 runs a program (including a program that carries out the functions of the respective processing units shown in the below-mentioned FIG. 4) stored in the ROM 203, and collectively controls the respective devices via the internal bus 206. For example, the CPU 201 conducts processing that records image data in a recording medium such as the HDD 204 by running the program.

The ROM 203 also stores shipment destination information signifying the region to which the image forming apparatus 102 is to be shipped. The language displayed in the input-output device 210 is determined according to this shipment destination information. The RAM 202 functions as a memory and work area of the CPU 201. The network I/F 205 conducts one-way or two-way data exchange with an external network device or the PC 105 via the LAN 101. The device control unit 207 controls the printing unit 208. The HDD 204 functions as an external memory, and stores image data and the like. In addition, the HDD 204 stores counter information, system information, and monitoring information. The input-output device 210 receives inputs (scans instruction, button depression, and the like) from the user, and conveys the input content to the respective processing units via the input-output I/F 209.

Figure 3:
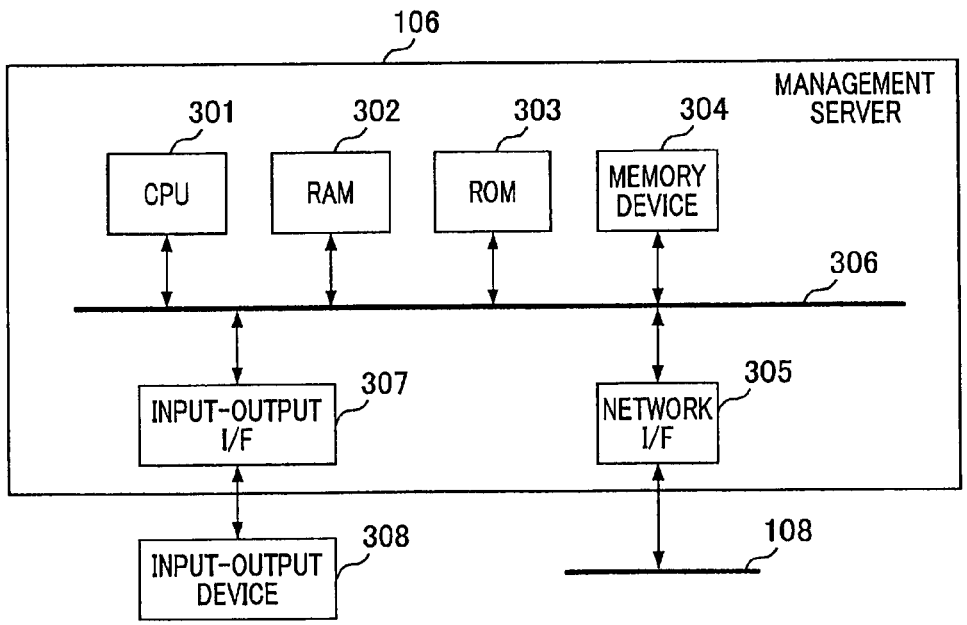
FIG. 3 illustrates an exemplary hardware configuration of a management server.

FIG. 3 is a drawing which illustrates an exemplary hardware configuration of a management server. The management server 106 is provided with a CPU 301, a RAM 302, a ROM 303, a memory (HDD) 304, a network I/F 305, an internal bus 306, an input-output I/F 307, and an input-output device 308.

The CPU 301 controls the entirety of the management server. The CPU 301 runs a program (including a program that carries out the respective processing units shown in the below-mentioned FIG. 5) stored in the ROM 303, and collectively controls the respective devices via the internal bus 306.

The internal bus 306 is connected to the RAM 302, the ROM 303, the HDD 304, the network I/F 305, and the input-output I/F 307. The input-output I/F 307 is provided with, for example, a PS/2 or USB I/F, and an analog or digital display I/F. USB is an abbreviation for Universal Serial Bus.

The input-output device 308 is a keyboard or mouse and a CRT or liquid-crystal display, and can be connected to the management server 106 via the input-output I/F 307. CRT is an abbreviation for Cathode Ray Tube.

The management server 106 is connected to the Internet 108 via the network I/F 305, and communicates with the image forming apparatus 102 and the PC 105. The HDD 304 functions as an external memory device, and stores device information obtained from the image forming apparatus 102. In addition, the HDD 304 stores system information and processing information in place of the RAM 302.

Figure 4:
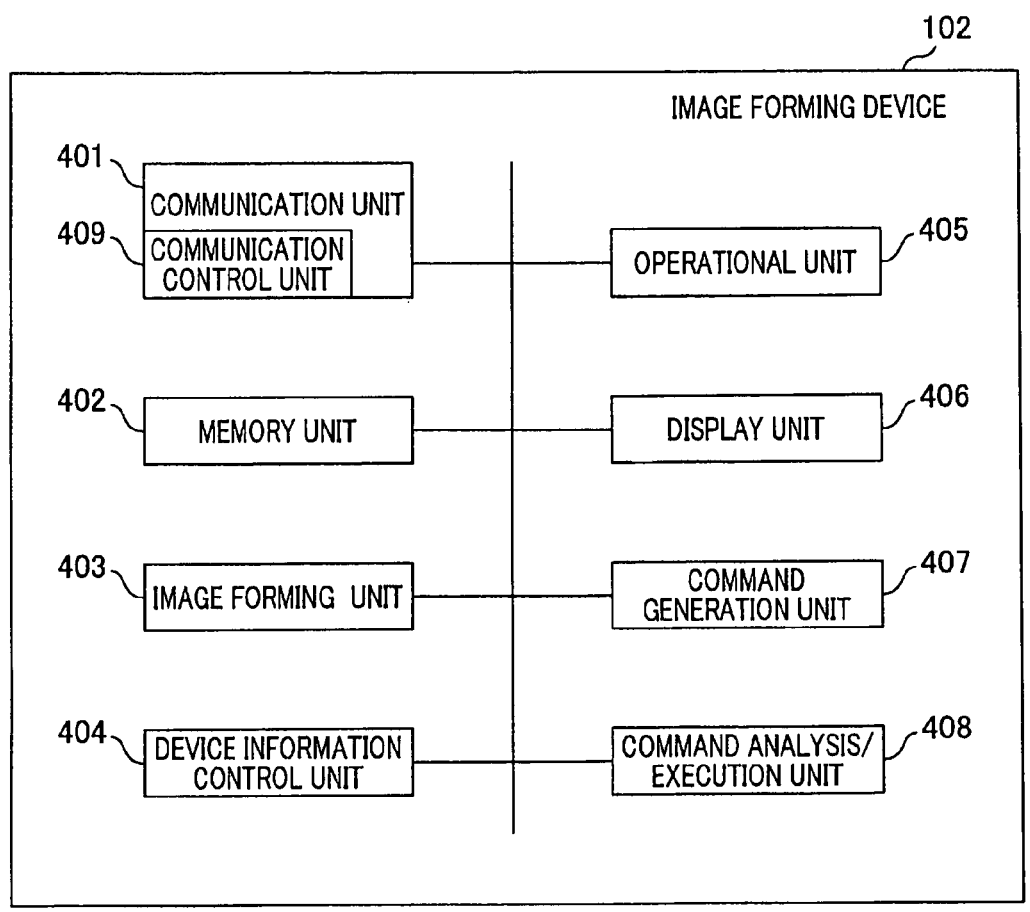
FIG. 4 is an exemplary functional block diagram of an image forming apparatus.

FIG. 4 is an exemplary functional block diagram of an image forming apparatus. The image forming apparatus 102 is provided with a communication unit 401, a memory 402, an image forming unit 403, a device information control unit 404, an operating unit 405, a display unit 406, a command generation unit 407, and a command analysis/execution unit 408.

The communication unit 401 transmits device information of the image forming apparatus 102 to the management server 106. The communication unit 401 also receives instructions and information that are transmitted from the management server 106. The communication unit 401 communicates with the management server 106 using SMTP or HTTP/HTTPS or the like.

The communication unit 401 is provided with a communication control unit 409. The communication control unit 409 conducts control such as changing the communication system while the communication unit 401 is communicating with the management server 106. For example, the communication control unit 409 changes the communication system from a polling type that uses HTTP to a push type that uses a WebSocket protocol.

In the present embodiment, a communication system of the polling type is considered to be a system in which a command is sent in response to a request from a client, when the server sends a command or the like to a client. A communication system of the push type is considered to be a system in which a command is transmitted via an established prescribed connection, with the server as the point of origin and without awaiting a request from the client, when the server sends a command or the like to a client. Now, an established prescribed connection in the push type indicates a connection that is established according to the handshake by the client, for example, the WebSocket protocol.

In the present invention, in addition to the WebSocket protocol, other protocols capable of conducting the communication of the polling type and the push type may also be applied.

The memory unit 402 exchanges information with the storage areas of the RAM 202, the ROM 203, and the memory device 204. In addition, the memory unit 402 stores management server information, as well as operational history, and data representing various types of anomalous states of the image forming apparatus 102. Management server information includes communication information such as the IP address of the management server 106 that manages the image forming apparatus 102.

The image forming unit 403 has a function that generates and outputs printing data. The device information control unit 404 manages device information. For example, the device information control unit 404 conducts printing control and management of anomalous states of the image forming apparatus 102. The device information control unit 404 also manages counter information and notification information. The device information control unit 404 also conducts control related to color adjustment, and setting of print modes and other functions.

The operating unit 405 is an interface that is designed to issue operational instructions such as printing instructions to the image forming apparatus 102 from the user. The display unit 406 displays status information, setting information, and the like of the image forming apparatus 102. The display unit 406 also conducts display of various buttons, and senses user instructions by the pressing of buttons.

The command generation unit 407 generates transmission commands for transmitting device information managed by the device information control unit 404 to the management server 106. These transmission commands are transmitted to the management server 106 by the communication unit 401. The command analysis/execution unit 408 analyzes the response from the management server 106 to the transmission command. In addition, the command analysis/execution unit 408 receives commands transmitted by the management server 106 via the communication unit 401, and analyzes and executes the received commands.

Figure 5:
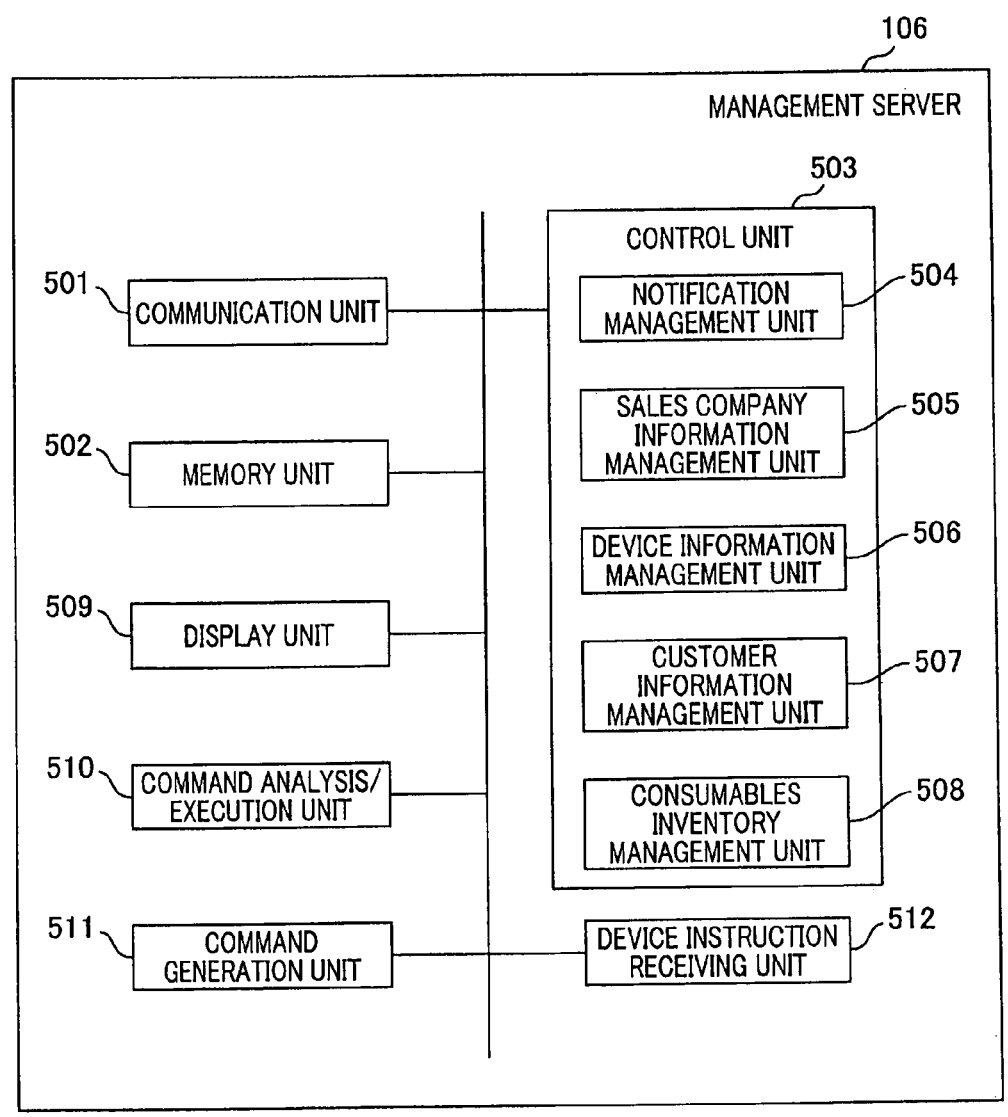
FIG. 5 is an exemplary functional block diagram of a management server.

FIG. 5 is an exemplary functional block diagram of a management server. The management server 106 is provided with a communication unit 501, a memory unit 502, a control unit 503, a display unit 509, a command analysis/execution unit 510, and a command generation unit 511. The management apparatus control method of the present embodiment is carried out by the functions of the respective processing units with which the management server 106 shown in FIG. 5 is provided. The computer program of the present embodiment makes the computer to execute the aforementioned management apparatus control method.

The communication unit 501 has the function of conducting communication with the image forming apparatuses 102. Specifically, the communication unit 501 receives device information transmitted from an image forming apparatus 102. The communication unit 501 also receives server instruction inquiries from the image forming apparatus 102. A server instruction inquiry is an inquiry concerning whether the management server 106 is holding a server instruction for the image forming apparatus 102. Such inquiries are conducted periodically, for example, twice a day. A server instruction is an instruction issued by the management server 106 to an external device, and in cases where a user (operator) has registered more than one instruction as necessary, these instructions are stored in the memory unit 502. The communication unit 501 transmits the necessary instructions and information to the image forming apparatus 102.

The memory unit 502 exchanges information with the memory areas of the RAM 302, the ROM 303, and the memory device 304. Specifically, the memory unit 502 preserves device information, sales company information, customer information, and the like. In addition, server instructions are stored in the memory unit 502. The control unit 503 has a control function whereby necessary information is managed in order to conduct monitoring and maintenance of the image forming apparatus 102.

The control unit 503 is provided with a notification management unit 504, a sales company information management unit 505, a device information management unit 506, a customer information management unit 507 and a consumables inventory management unit 508. The notification management unit 504 generates notification information and designates notification recipients for various types of notifications. A notification is, for example, a maintenance request notification to a serviceman who maintains the image forming apparatuses 102, a replacement request notification for consumables, a notification that an image forming apparatus 102 has failed to execute processing in accordance with an instruction from the management server, and so on.

The sales company information management unit 505 manages information about the sales companies who conduct management and support of the image forming apparatuses 102 installed on the customer side. The device information management unit 506 manages the device information obtained from the image forming apparatuses 102 via the communication unit 501. By this means, the image forming apparatuses 102 that are subject to maintenance are managed. For example, the device information management unit 506 manages ID information of the image forming apparatuses, information about anomalous states of the image forming apparatuses, maintenance histories, information about managers of the image forming apparatuses, information about management of consumables of the image forming apparatuses, and so on.

The customer information management unit 507 manages customer information. Customer information is information about customers who own the image forming apparatuses 102. Customer information includes, for example, information concerning maintenance contracts with the sales company. The consumables inventory management unit 508 conducts inventory management of consumables such as toner/ink, parts, and the like. Specifically, the consumables inventory management unit 508 conducts inventory drawdown based on information indicating the remaining amount of toner/ink and information indicating parts replacement that are sent from the image forming apparatus 102. When inventory drawdown results exceed a pre-set threshold value, the consumables inventory management unit 508 cooperates with the notification management unit to issue notifications such as a consumable resupply request notification.

The display unit 509 displays device information stored in the memory unit 502 as a Web screen. A WWW server program operates in the management server 106, thereby enabling a serviceman or the like of the sales company to peruse the device information using a web browser on a PC.

The command analysis/execution unit 510 receives the commands transmitted by image forming apparatus 102 from the communication unit 501, and analyzes and executes them. The command analysis/execution unit 510 also causes the analysis results to be reflected in the memory unit 502, the control unit 503, and the display unit 509. The command generation unit 511 generates a response to the image forming apparatus 102 that was the transmission source of the pertinent command, based on the results of analysis of the command by the command analysis unit 510. The command generation unit 511 also generates a command corresponding to an instruction for the image forming apparatus 102. An instruction for the image forming apparatus 102 is, for example, a reboot request, a firmware update request, or the like. The communication unit 501 transmits this command to the image forming apparatus 102.

The device instruction receiving unit 512 receives instructions from the user through a UI or the like. The device instruction receiving unit 512 stores the received instruction in the memory unit 502 as a server instruction. The command generation unit 511 extracts the server instruction from the memory unit 502, and generates a command corresponding to the extracted server instruction.

First Embodiment

Figure 6:
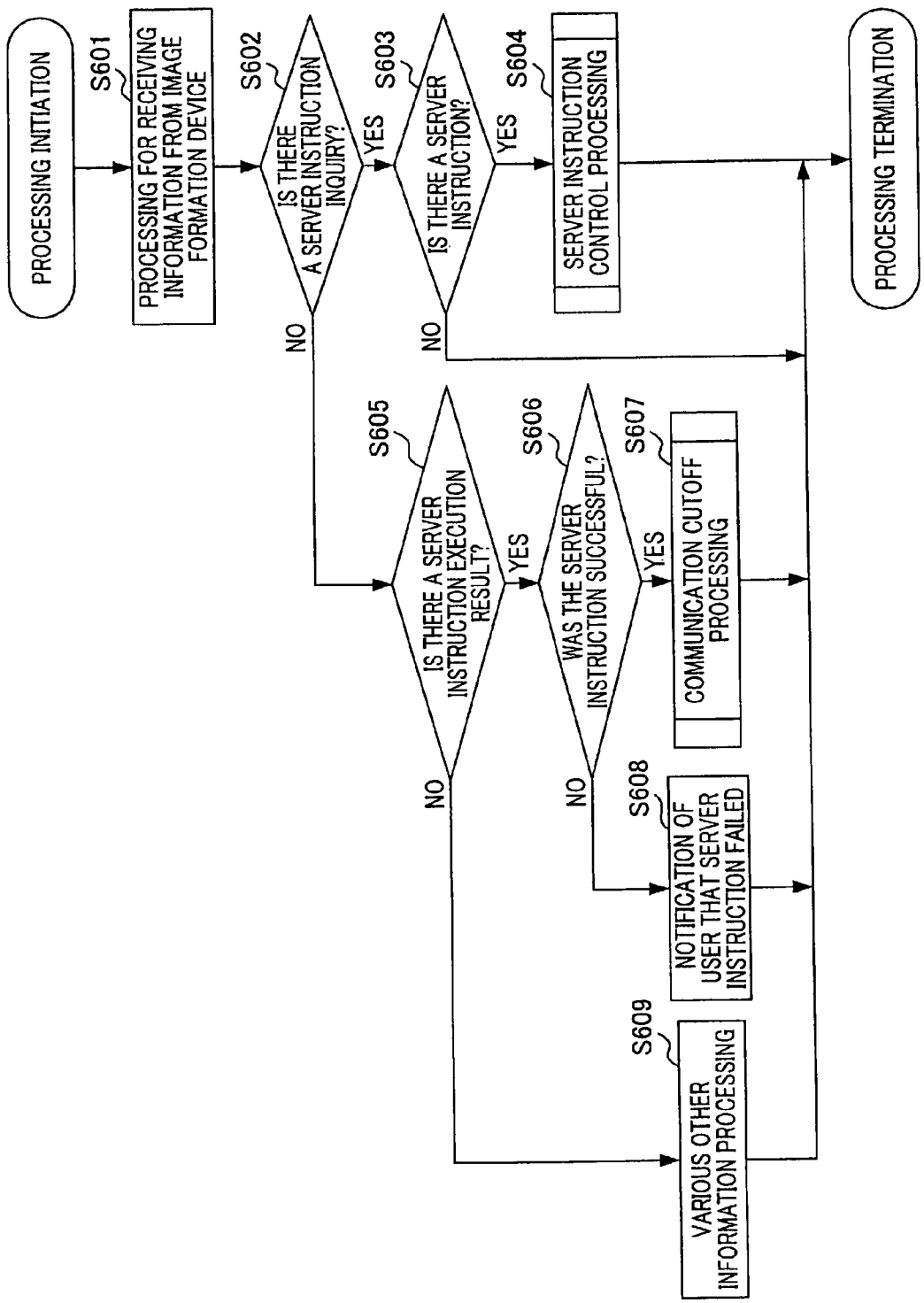
FIG. 6 is a flowchart which describes an example of overall operational processing by a management server.

FIG. 6 is a flowchart which describes an example of overall operational processing of a management server in a first embodiment. First, the communication unit 501 of the management server 106 receives information transmitted from an image forming apparatus 102 (step S601). Subsequently, the command analysis/execution unit 510 discriminates whether the information received in step S601 is a server instruction inquiry of the image forming apparatus 102 (step S602).

In the case where the command analysis/execution unit 510 discriminates that the received information is a server instruction inquiry, the processing advances to step S603. Subsequently, the command generation unit 511 discriminates whether there is a server instruction in the memory unit 502 (step S603). In the case where the command generation unit 511 discriminates that there is no server instruction, the processing terminates. In the case where the command generation unit 511 discriminates that there is a server instruction, the processing advances to step S604. The command generation unit 511 then performs server instruction control processing (step S607), and the processing terminates. Server instruction control processing is processing in which an instruction is issued to the image forming apparatus 102 to switch the communication system according to the type of server instruction. The details of server instruction control processing are described with reference to FIG. 7.

In the discrimination processing of the aforementioned step S602, when the command analysis/execution unit 510 discriminates that the received information is not a server instruction inquiry, the processing advances to step S605. Subsequently, the command analysis/execution unit 510 discriminates whether the received information is a server instruction execution result (step S605).

In the case where the command analysis/execution unit 510 discriminates that the received information is not a server instruction execution result, the processing advances to step S609. The prescribed processing units with which the management server 106 is provided then conduct various types of information processing based on the received information (step S609).

In the case where the command analysis/execution unit 510 discriminates that the received information is a server instruction execution result of the image forming apparatus 102, the processing advances to step S606. The command analysis/execution unit 510 then discriminates based on the server instruction execution result whether the image forming apparatus 102 has succeeded in carrying out processing according to the server instruction (step S606). That is, the command analysis/execution unit 510 discriminates whether the processing was successfully executed, based on the processing execution result returned from the image forming apparatus 102 that executed the processing according to the server instruction received from the communication unit 501.

In the case where the command analysis/execution unit 510 discriminates that the image forming apparatus 102 failed to execute the processing according to the server instruction, the processing advances to step S608. The notification management unit 504 then notifies the user that the server instruction failed (step S608).

In the case where the command analysis/execution unit 510 discriminates that the image forming apparatus 102 successfully carried out processing according to the server instruction, the processing advances to step S607. The communication unit 501 then conducts communication disconnection processing (step S607). The details of communication disconnection processing are described with reference to FIG. 8.

Figure 7:
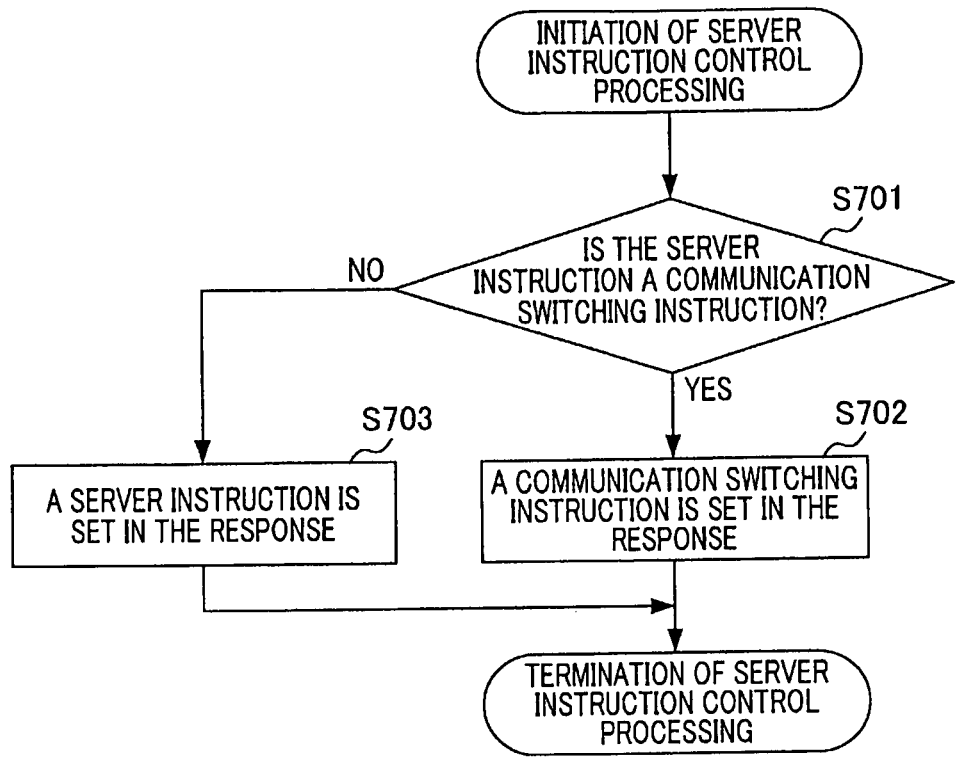
FIG. 7 is a flowchart which describes an example of server instruction control processing.

FIG. 7 is a flowchart which describes an example of server instruction control processing in step S604 of FIG. 6. The command generation unit 511 discriminates whether the server instruction is a communication switching instruction (step S701). A communication switching instruction is an instruction pertaining to the image forming apparatus 102, and is an instruction to switch the communication system for communicating with the management server 106 to push communication. Push communication is a prescribed communication system which enables instructions to be issued from the management server 106 without a request from the image forming apparatus 102.

In the case where the command generation unit 511 discriminates that the server instruction is a communication switching instruction, the command generation unit 511 sets a communication switching instruction in the response to the server instruction inquiry from the image forming apparatus 102 (step S702). The communication unit 501 returns this response to the image forming apparatus 102. In the case where the result of discrimination in step S701 is that the server instruction is not a communication switching instruction, the command generation unit 511 sets another server instruction in the response to the server instruction inquiry from the image forming apparatus 102 (step S703).

Figure 8:
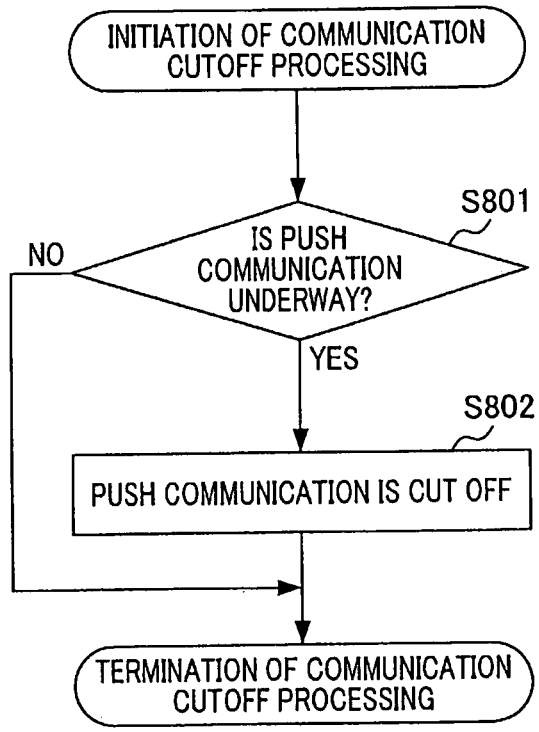
FIG. 8 is a flowchart which describes an example of communication disconnection processing.

FIG. 8 is a flowchart which describes an example of communication disconnection processing in step S607 of FIG. 6. The communication unit 501 discriminates whether push communication with the image forming apparatus 102 is underway (step S801). In the case where the communication unit 501 discriminates that push communication with the image forming apparatus 102 is not underway, communication disconnection processing terminates. In the ease where the communication unit 501 discriminates that push communication with the image forming apparatus 102 is underway, the communication unit 501 cuts off push communication (step S802). According to this communication disconnection processing, it is possible to alleviate the load imposed by push communication on the management server 106 by conducting push communication only when necessary, and by interrupting sessions that have become unnecessary.

Figures 9, 10:
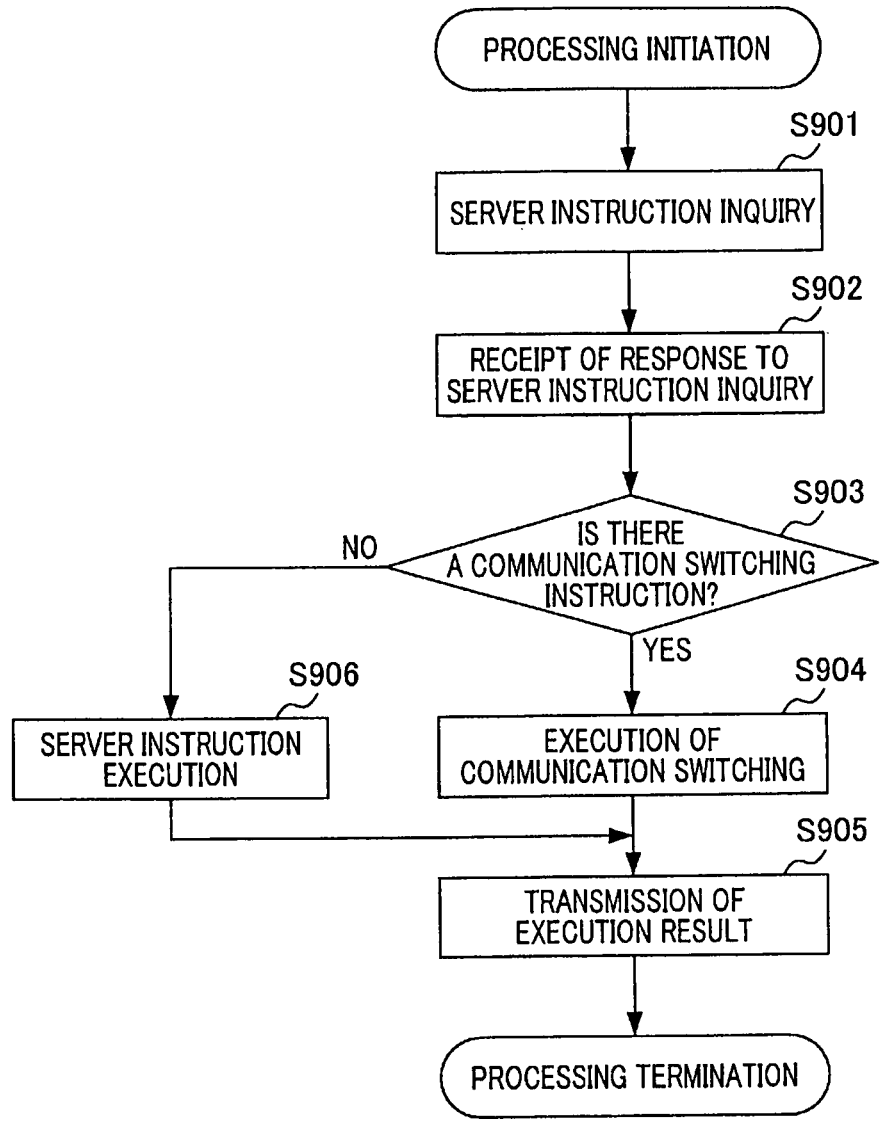
FIG. 9 is a flowchart which describes an example of operational processing by an image forming apparatus.
FIG. 10 is a drawing which shows an example of server instruction content retained by a management server.

FIG. 9 is a flowchart which describes an example of operational processing of an image forming apparatus in the first embodiment. First, an image forming apparatus 102 issues a server instruction inquiry to the management server 106 (step S901). Specifically, the communication unit 401 with which the image forming apparatus 102 is provided transmits a server instruction inquiry to the communication unit 501 with which the management server 106 is provided. In this example, the server instruction inquiry is carried out by transmitting a GetRequest of an HTTP protocol to the management server 106. That is, the image forming apparatus 102 asks the management server 106 whether there is an instruction for it. These inquiries are conducted at a certain fixed interval.

Next, the image forming apparatus 102 receives a response to the server instruction inquiry from the management server 106 (step S902), in the case where a communication switching instruction is contained in the response to the server instruction inquiry, the communication unit 401 with which the image forming apparatus 102 is provided receives the communication switching instruction in response to the server instruction inquiry. Subsequently, the image forming apparatus 102 analyzes the response received in the aforementioned step S902 via the command analysis/execution unit 408, and discriminates whether the server instruction contained in the response is a communication switching instruction (step S903).

In the case where the server instruction contained in the response is a communication switching instruction, the image forming apparatus 102 executes communication switching by the command analysis/execution nit 408 (step S904), and the processing advances to step S905. Specifically, the communication unit 401 and the command analysis/execution unit 408 carry out the following processing in accordance with the communication switching instruction. The communication system for communication between the image forming apparatus 102 and the management server 106 is switched to push communication by conducting an initial communication with the management server 106 according to the communication switching instruction.

Communication switching is, for example, carried out as follows. First, the image forming apparatus 102 conducts an initial communication with the management server 106. In this example, the initial communication is conducted by an HTTP request that is called a WebSocket handshake. Specifically, an application such as a browser with which the image forming apparatus 102 is provided transmits the WebSocket handshake to the management server 106 (conducts a handshake request). The management server 106 returns a handshake response to the handshake request from the browser, whereby a WebSocket connection is established, i.e., push communication is established. After push communication has been established, the communication unit 501 and the command generation unit 511 of the management server 106 issue instructions (server instructions) to the image forming apparatus 102 using the aforementioned established push communication.

In the case where the server instruction contained in the response is not a communication switching instruction, the image forming apparatus 102 executes the server instruction by the command analysis/execution unit 408 (step S906), and the processing advances to step S905. The image forming apparatus 102 then transmits the execution result to the management server 106 (step S905), and the processing terminates. According to the processing described with reference to FIG. 9, the management server 106 can issue instructions to the image forming apparatus 102 in real time, and obtain execution results.

In the present embodiment, a description has been given of processing in which the management server 106 causes the image forming apparatus 102 to execute a communication switching instruction received from a user, and switch the communication system between the server and the client to push communication. In addition, illustrations have been given of a configuration of the management server 106 and the image forming apparatus 102, a configuration of soft modules, an information table, and a process related to initiation of monitoring service after registration confirmation, but these are exemplary, and are not to be considered as limiting.

The management server 106 of the first embodiment is capable of switching the communication system for communicating with an image forming apparatus to push communication that enables instructions to be issued to the image forming apparatus without requests from the image forming apparatus. In addition, the management server 106 communicates by conducting push communication with the image forming apparatus 102 only in prescribed cases. Therefore, according to the management server 106, it is possible to achieve efficient two-way communication while inhibiting the load for maintaining a communication session with the image forming apparatus 102.

Second Embodiment

In a second embodiment, the management server 106 discriminates whether or not to switch to push communication based on the content of a server instruction registered in the memory unit 502 of the management server 106.

FIG. 10 is a drawing which illustrates an example of content of server instructions retained by the management server. The sequence indicates the sequence of execution by the image forming apparatus 102. Server instruction content indicates the content of server instructions.

A schedule change request is a request to obtain a change in the timing of device information transmission to the management server 106 by the image forming apparatus 102. A reboot request is a request to obtain reboot of the image forming apparatus 102. A setting information transmission request is a request to obtain transmission of setting information of the image forming apparatus 102. A monitoring subject addition request is a request to obtain addition of a monitoring subject to the image forming apparatus 102. A firmware update request is a request to obtain update of firmware of the image forming apparatus 102.

Figure 11:
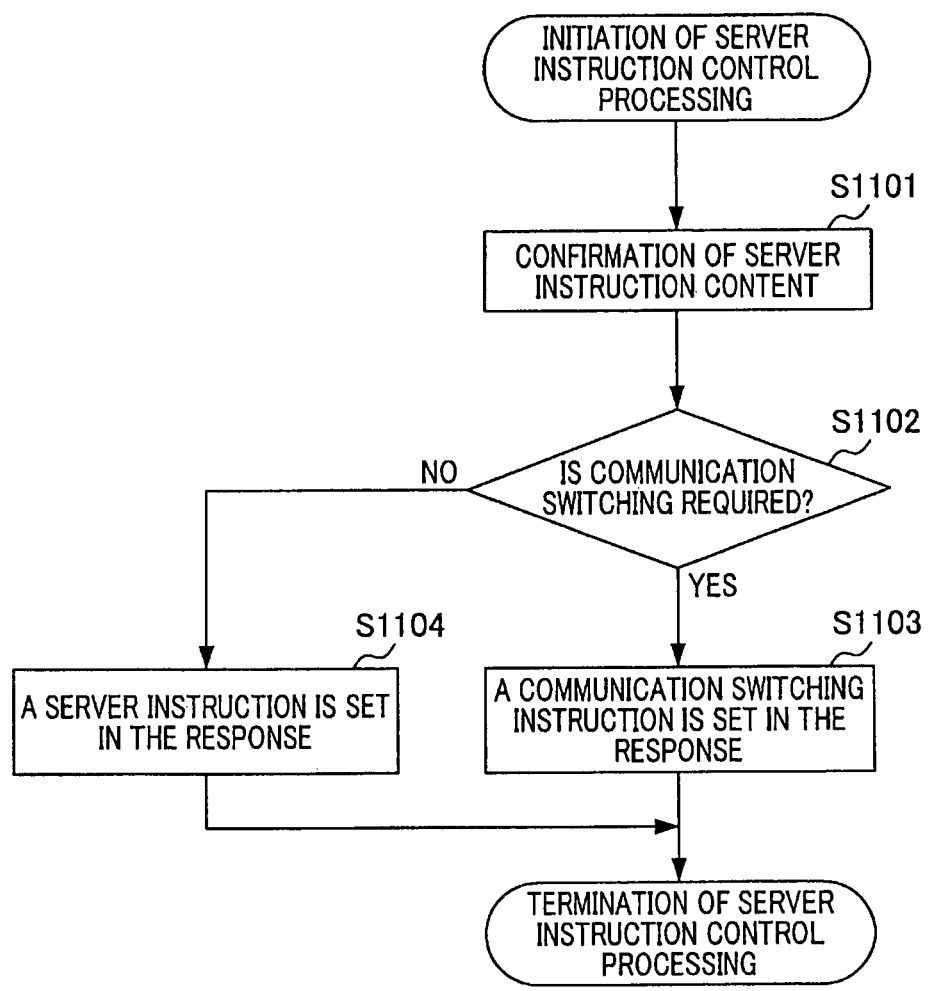
FIG. 11 is a flowchart which describes an example of server instruction control processing.

FIG. 11 is a flowchart which describes an example of server instruction control processing in the second embodiment. Overall operational processing of the management server 106 in the second embodiment is identical to overall operational processing according to the flowchart shown in FIG. 6. The flowchart shown in FIG. 11 corresponds to the processing of step S604 in FIG. 6.

The command generation unit 511 of the management server 106 confirms the content of the server instructions (step S1101). The content of the server instructions is, for example, the content shown in FIG. 10. Next, the command generation unit 511 discriminates whether it is necessary to issue a communication switching instruction to the image forming apparatus 102 (step S1102). Specifically, the command generation unit 511 discriminates whether the server instructions require conduct of push communication. A server instruction which requires conduct of push communication is an instruction that must be issued in real time to the image forming apparatus 102 in order to bring about immediate recovery, such as when a malfunction occurs. For example, a firmware update request is a server instruction which requires conduct of push communication. When there is a server instruction which requires conduct of push communication, the command generation unit 511 discriminates that it is necessary to issue a communication switching instruction to the image forming apparatus 102, and the processing advances to step S1103.

It is also acceptable for the command generation unit 511 to discriminate that a communication switching instruction must be issued to the image forming apparatus 102 in step S1102 in the case where there are multiple server instructions to be issued to the image forming apparatus. This discrimination has the advantage that it is possible to save the several-minute portion of stand-by time for server instructions of the inquiry from the image forming apparatus 102. It is also acceptable for the command generation unit 511 to discriminate that a communication switching instruction must be issued to the image forming apparatus 102 in the case where there is a reboot request, i.e., where reboot of the image forming apparatus 102 is necessary.

That is, the communication unit 501 and the command generation unit 511 transmit a communication switching instruction in the case where there are multiple server instructions, in the case where there is an instruction that must be issued in real time, in the case where reboot of the image forming apparatus 102 is required, and so on.

Next, the command generation unit 511 sets a communication switching instruction in the response to the server instruction inquiry from the image forming apparatus 102 (step S1103), and transmits the response via the communication unit 501 to the image forming apparatus 102.

In the case of a server instruction that does not require switching to push communication, the command generation unit 511 discriminates that it is unnecessary to issue a communication switching instruction to the image forming apparatus 102, and the processing advances to step S1104. The command generation unit 511 then sets another server instruction in the response to the server instruction inquiry from the image forming apparatus 102 (step S1104), and transmits the response via the communication unit 501 to the image forming apparatus 102.

In the present embodiment, the description concerns the case where the management server 106 conducts discrimination of communication switching based on server instruction content, but one is not limited thereto. For example, it is also acceptable for the command generation unit 511 to discriminate communication switching based on the priority of the subject image forming apparatus 102. In addition, the command generation unit 511 may also discriminate communication switching based on customer information contained in the contract with the customer to whom the image forming apparatus 102 belongs.

Moreover, the prescribed conditions used in communication disconnection processing may also include receipt of a push communication disconnection request from the user device.

Figures 12, 13:
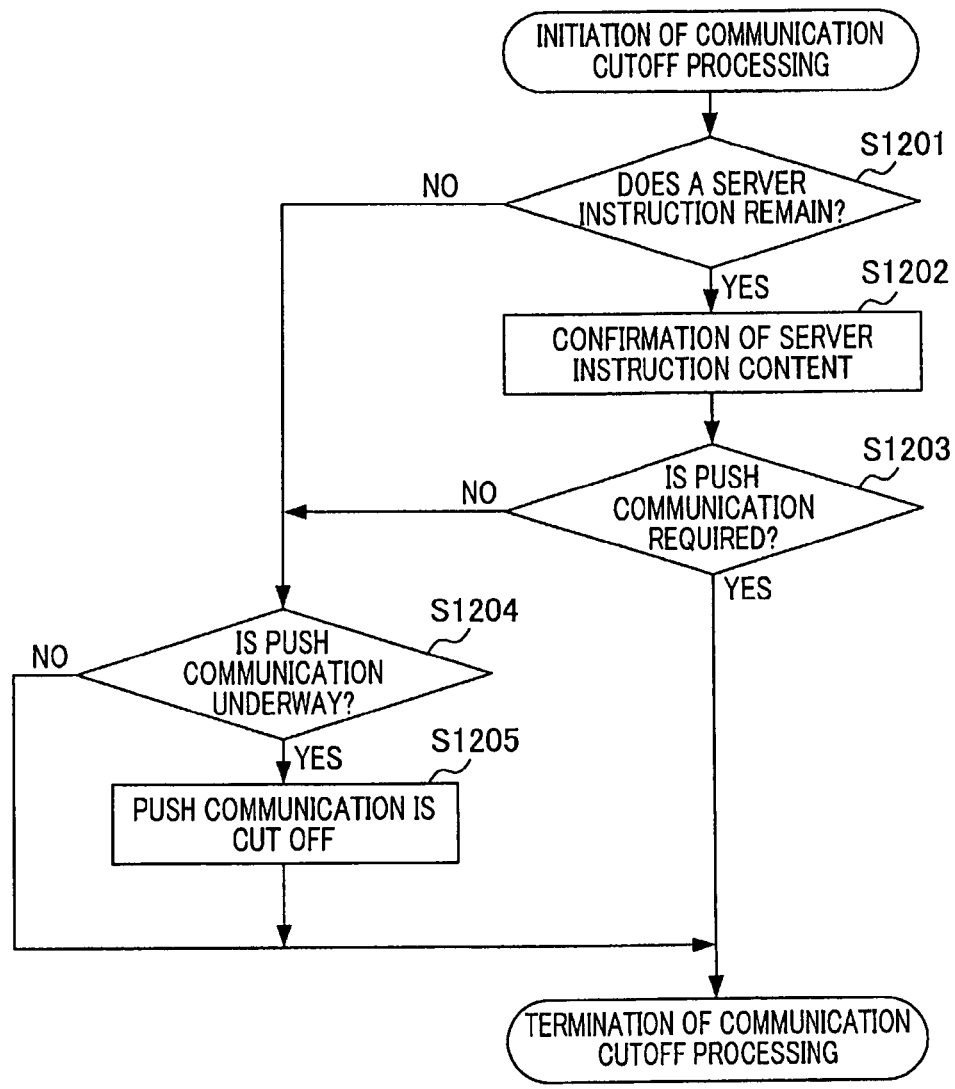
FIG. 12 is a flowchart which describes an example of communication disconnection processing.
FIG. 13 is an exemplary list of malfunctions retained by an image forming apparatus.

FIG. 12 is a flowchart which describes an example of communication disconnection processing in the second embodiment. The flowchart shown in FIG. 12 corresponds to the processing of step S607 in FIG. 6. The communication unit 501 discriminates whether server instructions remain in the memory unit 502 (step S1201). In the case where the communication unit 501 discriminates that a server instruction remains in the memory unit 502, the communication unit 501 confirms the content of the server instruction (step S1202). The communication unit 501 then discriminates whether the server instruction is a server instruction that requires conduct of push communication (step S1203). In the case where the server instruction is a server instruction that requires conduct of push communication, communication disconnection processing terminates. In the case where the server instruction is a server instruction that does not require conduct of push communication, the processing advances to step S1204.

In the case where the communication unit 501 discriminates that no server instructions remain in the memory unit 502 in the discrimination processing of step S1201, the processing advances to step S1204. The communication unit 501 then discriminates whether push communication with the image forming apparatus 102 is underway (step S1204). In the case where the communication unit 501 discriminates that push communication with the image forming apparatus 102 is not underway, communication disconnection processing terminates. In the case where the communication unit 501 discriminates that push communication with the image forming apparatus 102 is underway, the communication unit 501 cuts off push communication (step S1205).

According to the communication disconnection processing of the second embodiment, it is possible for the management server 106 to switch the system of communication with the image forming apparatus 102 to push communication according to the conditions for discriminating the necessity of switching to push communication. By cutting off push communication when push communication is no longer necessary (restoring the communication system), it is also possible to efficiently conduct two-way communication without increasing server resources.

In the present embodiment, a description has been given of processing which discriminates whether to switch to push communication according to the content of server instructions received from a user by the management server 106, and processing which cuts off communication when push communication is unnecessary. With respect to the criteria for communication switching discrimination and communication disconnecting discrimination by the management server 106, a description has been given citing the example of server instruction content, but this is exemplary, and the criteria for communication switching discrimination and communication disconnecting discrimination are not limited to server instruction content.

Third Embodiment

In a third embodiment, communication switching with respect to the management server 106 is executed from the image forming apparatus 102 side at the point when a malfunction occurs in the image forming apparatus 102. For this purpose, the image forming apparatus 102 retains a list of malfunctions in the memory device 204. The list of malfunctions is information concerning malfunctions that occur in the image forming apparatus 102.

FIG. 13 is a drawing which shows an exemplary list of malfunctions retained by an image forming apparatus in the third embodiment. The list of malfunctions has the data categories of Malfunction Code and Serviceman Dispatch Necessary/Unnecessary. Malfunction Code is identification information for uniquely identifying malfunctions. Serviceman Dispatch Necessary/Unnecessary indicates whether or not it is necessary to dispatch a serviceman if the pertinent malfunction occurs. A setting of 'unnecessary' in Serviceman Dispatch Necessary/Unnecessary indicates that it is unnecessary to dispatch a serviceman if the pertinent malfunction occurs. Malfunctions for which serviceman dispatch is unnecessary are malfunctions from which recovery occurs by rebooting or firmware updating of the image forming apparatus 102. That is, in the case of occurrence of a malfunction for which serviceman dispatch is unnecessary, the server instruction for recovery from the pertinent malfunction is a server instruction requiring conduct of push communication. A setting of 'necessary' in Serviceman Dispatch Necessary/Unnecessary indicates that it is necessary to dispatch a serviceman if the pertinent malfunction occurs.

Figure 14:
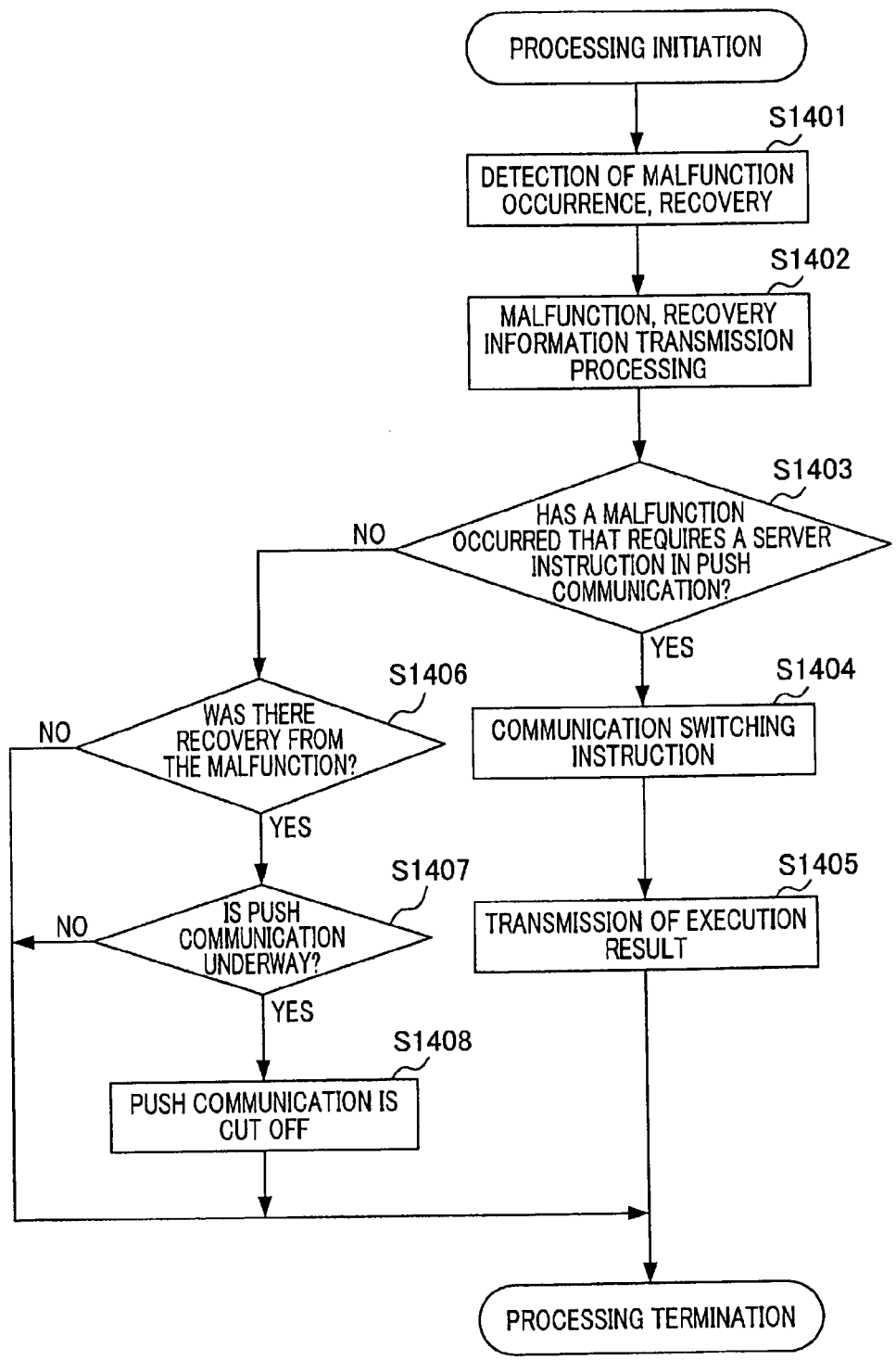
FIG. 14 is a flowchart which describes an example of operational processing by an image forming apparatus.

FIG. 14 is a flowchart which describes an example of operational processing of an image forming apparatus in the third embodiment. First, the image forming apparatus 102 detects a malfunction that has occurred in itself, or a recovery from a malfunction (step S1401). That is, a prescribed processing unit (for example, the device information control unit 404) with which the image forming apparatus 102 is provided detects a malfunction that has occurred in the image forming apparatus 102. Subsequently, the communication unit 401 with which the image forming apparatus 102 is provided transmits the information concerning the detected malfunction (malfunction information) or the information concerning recovery (recovery information) to the management server 106 (step S1402).

Next, the command analysis/execution unit 408 with which the image forming apparatus 102 is provided discriminates whether a malfunction has been detected, and whether the server instruction to be issued in order to recover from the pertinent malfunction is a server instruction requiring conduct of push communication (step S1403). Specifically, referencing the list of malfunctions shown in FIG. 13, the image forming apparatus 102 discriminates whether 'unnecessary' is set in Serviceman Dispatch Necessary/Unnecessary according to the malfunction code of the detected malfunction. In the case where 'unnecessary' is set in Serviceman Dispatch Necessary/Unnecessary according to the malfunction code of the detected malfunction, the image forming apparatus 102 discriminates that the server instruction to be issued in order to recover from the pertinent malfunction is a server instruction requiring conduct of push communication. In the case where 'necessary' is set in Serviceman Dispatch Necessary/Unnecessary according to the malfunction code of the detected malfunction, the image forming apparatus 102 discriminates that the server instruction to be issued in order to recover from the pertinent malfunction is a server instruction that does not require conduct of push communication.

In the case where a malfunction is detected, and the server instruction to be issued in order to recover from the detected malfunction is a server instruction requiring conduct of push communication, the processing advances to step S1404. The image forming apparatus 102 then initiates processing to switch the communication system for communicating with the management server 106 to push communication (step S1404). The image forming apparatus 102 then transmits the execution result of communication system switching to the management server 106 (step S1405), and processing terminates.

In the case where a malfunction is not detected, or where the server instruction to be issued in order to recover from the detected malfunction is a server instruction that does not require conduct of push communication, the processing advances to step S1406.

Next, the image forming apparatus 102 discriminates whether recovery from the malfunction has been detected (step S1406). In the case where recovery from the malfunction has not been detected, processing terminates. In the case where recovery from the malfunction has been detected, the processing advances to step S1407. Subsequently, the image forming apparatus 102 discriminates whether push communication with the management server 106 is underway (step S1407). In the case where push communication with the management server 106 is not underway, processing terminates. In the case where push communication with the management server 106 is underway, the processing advances to step S1408. The image forming apparatus 102 then cuts off push communication, and terminates processing.

According to the processing described with reference to FIG. 14, in the case where a malfunction occurs in the image forming apparatus 102, it is possible to conduct real-time processing by push communication, and mitigate user downtime by a rapid response. In addition, wasteful server resource consumption can be prevented by cutting off push communication at the point when the image forming apparatus 102 has recovered from the malfunction. In the present embodiment, the description has concerned processing in which the system of communication with the management server 106 is switched by the image forming apparatus 102 according to the type of malfunction that occurs therein, but the discrimination criteria for communication system switching are not limited to types of malfunction.

Fourth Embodiment

In the case where there is no push communication function in the image forming apparatus 102, or where the image forming apparatus 102 does not handle switching of communication systems according to switching instructions from the management server, the management server of a fourth embodiment updates the firmware of the image forming apparatus 102, thereby enabling push communication.

Figure 15:
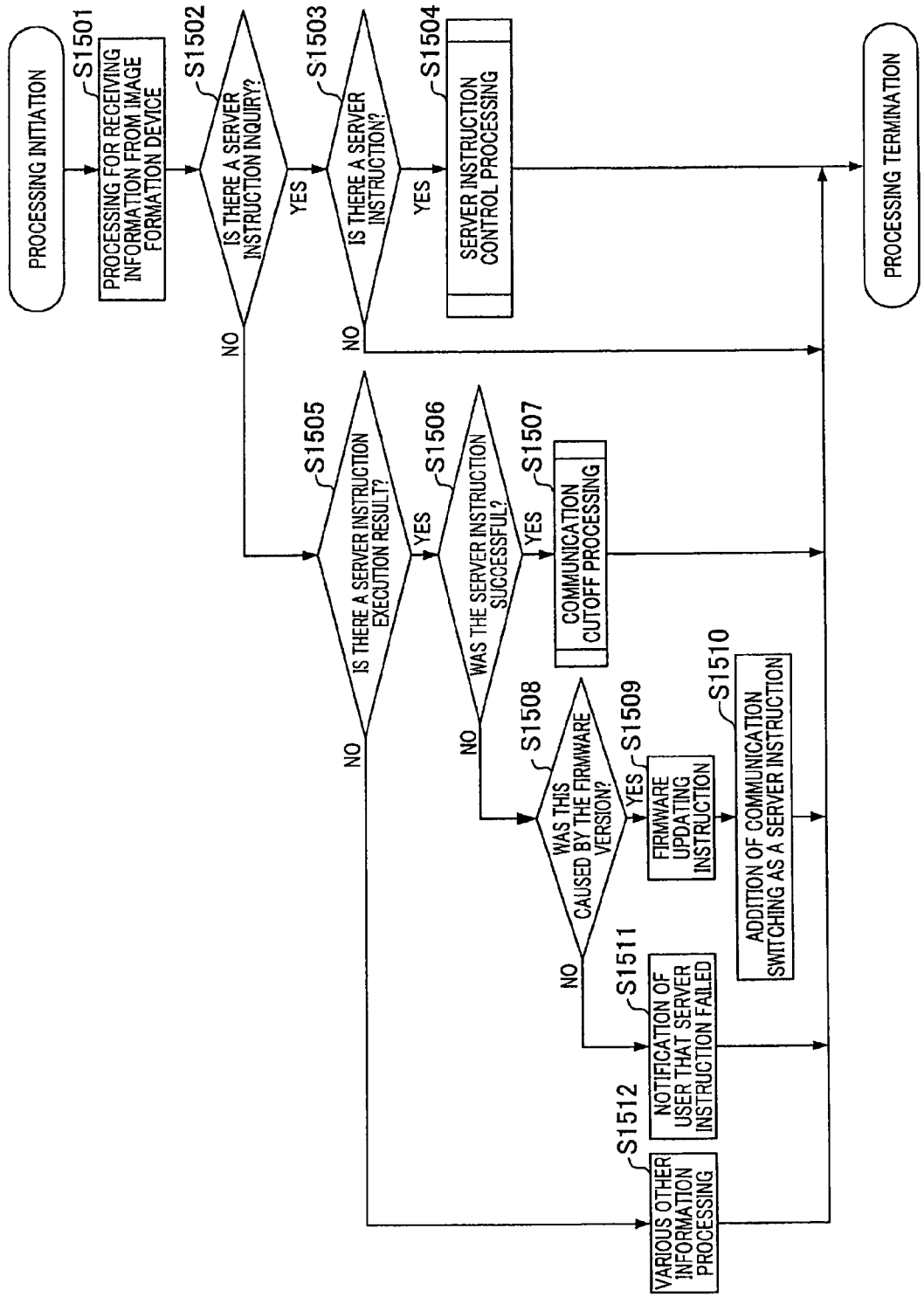
FIG. 15 is a flowchart which describes an example of overall operational processing by a management server.

FIG. 15 is a flowchart which describes an example of overall operational processing of the management server of the fourth embodiment. Steps S1501 to S1507 of FIG. 15 are identical to steps S601 to S607 of FIG. 6. In addition, step S1512 of FIG. 15 is identical to step S609 of FIG. 6.

In the case where the command analysis/execution unit 510 discriminates that the image forming apparatus 102 has failed to execute processing according to a server instruction in the discrimination processing of step S1506 in the fourth embodiment, the processing advances to step S1508. Specifically, the processing advances to step S1508 in the case where a notification indicating failure is received from an image forming apparatus that has received an instruction from the management server to switch the communication system to push communication, and in like cases.

Subsequently, the command generation unit 407 identifies the cause of the failure by the image forming apparatus 102 to execute processing according to the server instruction. The command generation unit 407 discriminates whether the identified cause is that the firmware of the image forming apparatus 102 does not accommodate push communication, or does not handle switching of communication systems according to switching instructions from the management server (step S1508). Now, in the case where it does not accommodate push communication, or where it does not handle switching of communication systems according to switching instructions from the management server ('Yes' in step S1508), the processing advances to step S1509. In the case where a 'No' is determined in step S1508, the processing advances to step S1511. The communication unit 501 then notifies the user that the image forming apparatus 102 has failed to execute processing according to the server instruction (step S1511), and processing terminates.

In step S1509, the command generation unit 407 issues a firmware update request. The image forming apparatus 102 that receives this firmware update request accomplishes the firmware updating by downloading and running the desired firmware from a distribution server (not illustrated in the drawing) that manages the various types of firmware. Subsequently, the command generation unit 407 adds a communication switching instruction to the memory unit 502 as a server instruction (step S1510), and processing terminates.

According to the processing described with reference to FIG. 15, even if the image forming apparatus 102 does not have a push communication function, push communication can be enabled by updating of firmware.

Fifth Embodiment

In a fifth embodiment, in the midst of conducting push communication with image forming apparatuses 102, the management server 106 notifies the user that push communication is underway.

FIG. 16 is a drawing which shows an example of a screen that is displayed by a management server. In the case where the system of communication with image forming apparatuses 102 is push communication, the display unit 509 with which the management server 106 is provided displays (informs the user) on a portal screen that push communication is underway, as shown by reference number 1601 in FIG. 16 ('Web Socket communication underway' in the drawing). In addition, the image forming apparatuses 102 with which push communication is underway are displayed with highlighting, as shown by reference number 1602. According to the functions of this display unit 509, the user is able to discriminate from the screen whether real-time processing is possible or not with respect to the image forming apparatuses 102. In the present embodiment, the case is described where the user is notified that push communication is underway by a screen display, but notification by email or the like is also acceptable.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-087071 filed Apr. 6, 2012, which is hereby incorporated by reference herein in its entirety.

The invention claimed is:

1. An Internet-based management apparatus that manages image forming apparatuses, the management apparatus comprising:
   a memory device configured to store instructions to be issued to the image forming apparatuses; and
   a processor coupled to the memory device and programmed to function as:
   a receiver for receiving inquiries from each of the image forming apparatuses,
   a transmitter for transmitting, when an instruction to be issued to an image forming apparatus has been stored in the memory device, a switching instruction to the image forming apparatus in response to a received inquiry from the image forming apparatus, without transmitting the switching instruction when an instruction to be issued to the image forming apparatus has not been stored in the memory device, wherein the switching instruction switches a communication protocol used in communicating between the image forming apparatus and the management apparatus to a WebSocket protocol,
   a notification unit configured to inform a user of information indicating that the connection according to the WebSocket protocol has been established with the image forming apparatus,
   an instruction unit configured to issue, after a connection according to the WebSocket protocol has been established by an initial communication with the image forming apparatus in response to the switching instruction, instructions to the image forming apparatus by using the established connection according to the WebSocket protocol, and
   a disconnection unit configured to cut off the established connection according to the WebSocket under prescribed conditions,
   wherein, when the receiver has received information from an image forming apparatus regarding an occurrence therein of a predetermined malfunction, a connection according to the WebSocket protocol is established, according to the initial communication, with the image forming apparatus that transmitted the information regarding the occurrence of the predetermined malfunction, and the established connection is cut off by the image forming apparatus when the predetermined malfunction has been recovered.

2. The management apparatus according to claim 1, wherein the transmitter transmits the switching instruction when there is a plurality of instructions stored in the memory device, when the instructions stored in the memory device include an instruction that needs to be issued to the image forming apparatus in real time, or when it is necessary to reboot the image forming apparatus.

3. The management apparatus according to claim 1, wherein the disconnection unit cuts off the established connection according to the WebSocket protocol with the image forming apparatus upon receiving an execution result of processing corresponding to an instruction by the instruction unit from the image forming apparatus that executes the processing.

4. The management apparatus according to claim 3, wherein the disconnection unit cuts off the established connection according to the WebSocket protocol with the image forming apparatus in a case where there is no other instruction to be issued by the WebSocket protocol to the image forming apparatus when the execution result of the processing indicates success of the processing.

5. The management apparatus according to claim 1, wherein, with respect to the image forming apparatuses that do not handle the WebSocket protocol, or that do not handle switching to the WebSocket protocol according to the switching instruction, the instruction unit transmits a firmware updating instruction in response to an inquiry from the image forming apparatus so that switching to the WebSocket protocol is performed.

6. The management apparatus according to claim 1, wherein the prescribed conditions include reception of a request for a disconnection of the connection according to the WebSocket protocol from a user device.

7. The management apparatus according to claim 1, wherein the initial communication is a handshake for establishing a connection according to by the WebSocket protocol.

8. The management apparatus according to claim 1, wherein an inquiry received from the image forming apparatus is a GetRequest of an HTTP protocol.

9. A control method in an Internet-based management apparatus that manages image forming apparatuses, the control method comprising steps of:
storing instructions to be issued to the image forming apparatuses;
receiving an inquiry from an image forming apparatus;
transmitting, when an instruction to be issued to the image forming apparatus has been stored in the storing step, a switching instruction to the image forming apparatus in response to the received inquiry from the image forming apparatus, wherein,
when an instruction to be issued to the image forming apparatus has not been stored in the storing step, the switching instruction is not transmitted, and
the switching instruction switches a communication protocol used in communicating between the image forming apparatus and the management apparatus to a WebSocket protocol;
informing a user of information indicating that the connection according to the WebSocket protocol has been established with the image forming apparatus;
issuing, after a connection according to the WebSocket protocol has been established by an initial communication with the image forming apparatus in response to the switching instruction, an instruction to the image forming apparatus by using the established connection according to the WebSocket protocol; and
cutting off the established connection according to the WebSocket protocol under prescribed conditions,
wherein, when information from an image forming apparatus regarding an occurrence therein of a predetermined malfunction has been received in the receiving step, a connection according to the WebSocket protocol is established, according to the initial communication, with the image forming apparatus that transmitted the information regarding the occurrence of the predetermined malfunction, and the established connection is cut off by the image forming apparatus when the predetermined malfunction has been recovered.

10. A non-transitory storage medium storing a computer program that when executed causes a computer to perform a control method of an Internet-based management apparatus that manages image forming apparatuses, the control method comprising steps of:
storing instructions to be issued to the image forming apparatuses;
receiving an inquiry from an image forming apparatus;
transmitting, when an instruction to be issued to the image forming apparatus has been stored in the storing step, a switching instruction to the image forming apparatus in response to the received inquiry from the image forming apparatus, wherein,
when an instruction to be issued to the image forming apparatus has not been stored in the storing step, the switching instruction is not transmitted, and
the switching instruction switches a communication protocol used in communicating between the image forming apparatus and the management apparatus to a WebSocket protocol;
informing a user of information indicating that the connection according to the WebSocket protocol has been established with the image forming apparatus;
issuing, after a connection according to the WebSocket protocol has been established by an initial communication with the image forming apparatus in response to the switching instruction, an instruction to the image forming apparatus by using the established connection according to the WebSocket protocol; and
cutting off the established connection according to the WebSocket protocol under prescribed conditions,
wherein, when information from an image forming apparatus regarding an occurrence therein of a predetermined malfunction has been received in the receiving step, a connection according to the WebSocket protocol is established, according to the initial communication, with the image forming apparatus that transmitted the information regarding the occurrence of the predetermined malfunction, and the established connection is cut off by the image forming apparatus when the predetermined malfunction has been recovered.

11. A management system, comprising:
network devices; and
an Internet-based management apparatus that manages the network devices,
wherein the management apparatus includes:
a memory device configured to store instructions to be issued to the network devices in a memory device,
a receiver for receiving inquiries from each of the network devices,
a transmitter for transmitting, when an instruction to be issued to an image forming apparatus has been stored in the memory device, a switching instruction to the first network device in response to a received inquiry from the first network device, without transmitting the switching instruction when an instruction to be issued to the first network device has not been stored in the memory device, wherein the switching instruction switches a communication protocol used in communicating between the first network device and the management apparatus to a WebSocket protocol, an instruction unit configured to issue, after a connection according to the WebSocket protocol has been established by an initial communication with the first network device in response to the switching instruction, instructions to the first network device by using the established connection according to the WebSocket protocol, and a disconnection unit configured to cut off the established connection according to the WebSocket protocol under prescribed conditions, wherein the first network device includes:
- a receiver for receiving the switching instruction in response to an instruction inquiry addressed to the management apparatus,
- an establishment unit configured to establish a connection according to the WebSocket protocol between the first network device and the management apparatus by conducting the initial communication according to the received switching instruction,
- a detector for detecting a malfunction that occurs in the first network device, and
- a discrimination unit that discriminates whether a detected malfunction is a malfunction that is recoverable by an instruction from the management apparatus, wherein the establishment unit is configured to establish a connection according to the WebSocket protocol between the first network device and the management apparatus when it is discriminated that the detected malfunction is a malfunction that is recoverable by an instruction from the management apparatus, and wherein the established connection is cut off by the first network device when the detected malfunction has been recovered.

12. The management system according to claim 11, wherein the transmitter transmits the switching instruction when there is a plurality of instructions stored in the memory device, when the instructions stored in the memory device include an instruction that needs to be issued to the first network device in real time, or when it is necessary to reboot the first network device.

13. A control method in a management system that includes network devices and an Internet-based management apparatus that manages pertinent network devices, the control method comprising:

a storing step in which the management apparatus stores instructions to be issued to the network devices in a memory device;

a first receiving step in which the management apparatus receives an inquiry from a network device;

a transmitting step in which the management apparatus transmits, when an instruction to be issued to the network device has been stored in the memory device, a switching instruction to the network device as a response to the received inquiry from the network device, wherein, when an instruction to be issued to the image forming apparatus has not been stored in the memory device in the storing step, the switching instruction is not transmitted, and the switching instruction switches a communication protocol used in communicating between the network device and the management apparatus to a WebSocket protocol;

an instructing step in which the management apparatus issues, after a connection according to the WebSocket protocol has been established by an initial communication with the network device in response to the switching instruction, an instruction to the network device by using the established connection according to the WebSocket protocol;

a second receiving step in which the network device receives the switching instruction as a response to an instruction inquiry addressed to the management apparatus;

an establishing step in which the network device establishes a connection according to the WebSocket protocol between the network device and the management apparatus by conducting the initial communication according to the received switching instruction;

a disconnecting step in which the management apparatus cuts off the established connection according to the Web Socket protocol under prescribed conditions, a detecting step in which a malfunction that occurs in the network device is detected; and a discriminating step in which it is discriminated whether a detected malfunction is a malfunction that is recoverable by an instruction from the management apparatus, wherein, in the establishing step, a connection according to the WebSocket protocol between the network device and the management apparatus is established when, in the discriminating step, it is discriminated that the detected malfunction is a malfunction that is recoverable by an instruction from the management apparatus, and wherein the established connection is cut off by the first network device when the detected malfunction has been recovered.

14. The management apparatus according to claim 1, wherein, upon establishment of the connection according to the WebSocket, the disconnection unit cuts off the established connection according to the WebSocket protocol when the instruction stored in the memory device is not an instruction to be issued by the WebSocket protocol.

* * * * *